(12) United States Patent  
Cheng et al.

(10) Patent No.: US 9,031,398 B2  
(45) Date of Patent: May 12, 2015

(54) WIRELESS CAMERA APPARATUS AND WIRELESS CAMERA DEVICE

(71) Applicant: Azurewave Technologies, Inc., New Taipei (TW)

(72) Inventors: Yu-Ting Cheng, Hsinchu County (TW); Chee-Onn Ching, New Taipei (TW)

(73) Assignee: Azurewave Technologies, Inc., New Taipei (TW)

( * ) Notice: Subject to any disclaimer, the term of this patent is extended or adjusted under 35 U.S.C. 154(b) by 0 days.

(21) Appl. No.: 13/967,390

(22) Filed: Aug. 15, 2013

(65) Prior Publication Data

US 2015/0049241 A1    Feb. 19, 2015

(51) Int. Cl.
- *G03B 17/00* (2006.01)
- *H04N 5/232* (2006.01)
- *H04N 5/225* (2006.01)

(52) U.S. Cl.  
CPC ......... *H04N 5/23203* (2013.01); *H04N 5/2252* (2013.01); *H04N 5/23241* (2013.01)

(58) Field of Classification Search  
USPC .............................. 396/428, 535, 56, 59, 427  
See application file for complete search history.

(56) References Cited

U.S. PATENT DOCUMENTS

| | | | | |
|---|---|---|---|---|
| 4,112,818 A | * | 9/1978 | Garehime, Jr. | 89/41.05 |
| 5,177,520 A | * | 1/1993 | Kohno et al. | 396/129 |
| 6,830,387 B2 | * | 12/2004 | Rife | 396/427 |
| 7,500,795 B2 | * | 3/2009 | Sandhu | 396/428 |
| 8,702,045 B1 | * | 4/2014 | Parsons | 248/125.1 |
| 8,750,509 B2 | * | 6/2014 | Renkis | 380/270 |
| 2007/0057785 A1 | * | 3/2007 | Lee | 340/541 |
| 2014/0055611 A1 | * | 2/2014 | Wong et al. | 348/143 |

* cited by examiner

*Primary Examiner* — Clayton E Laballe  
*Assistant Examiner* — Warren K Fenwick  
(74) *Attorney, Agent, or Firm* — Li&Cai Intellectual Property (USA) Office (57) ABSTRACT

A wireless camera apparatus includes a power supply track and a wireless camera device detachably installed on the power supply track. The wireless camera device has a camera module and a linking module fixed on the camera module. The linking module has a connecting unit and a conductive unit electrically connected to the camera module. When the wireless camera device is installed on the power supply track, the connecting unit is coupled to the power supply track, and the conductive unit is electrically connected to the power supply track. Thus, the instant disclosure provides the wireless camera apparatus, which is adjustable to any position of the power supply track according to the user's demand. Besides, the instant disclosure further provides a wireless camera device.

9 Claims, 8 Drawing Sheets

WIRELESS CAMERA APPARATUS AND WIRELESS CAMERA DEVICE

BACKGROUND OF THE INVENTION

1. Field of the Invention

The instant disclosure relates to a camera device; particularly to a wireless camera apparatus and a wireless camera device.

2. Description of Related Art

Figure 1:
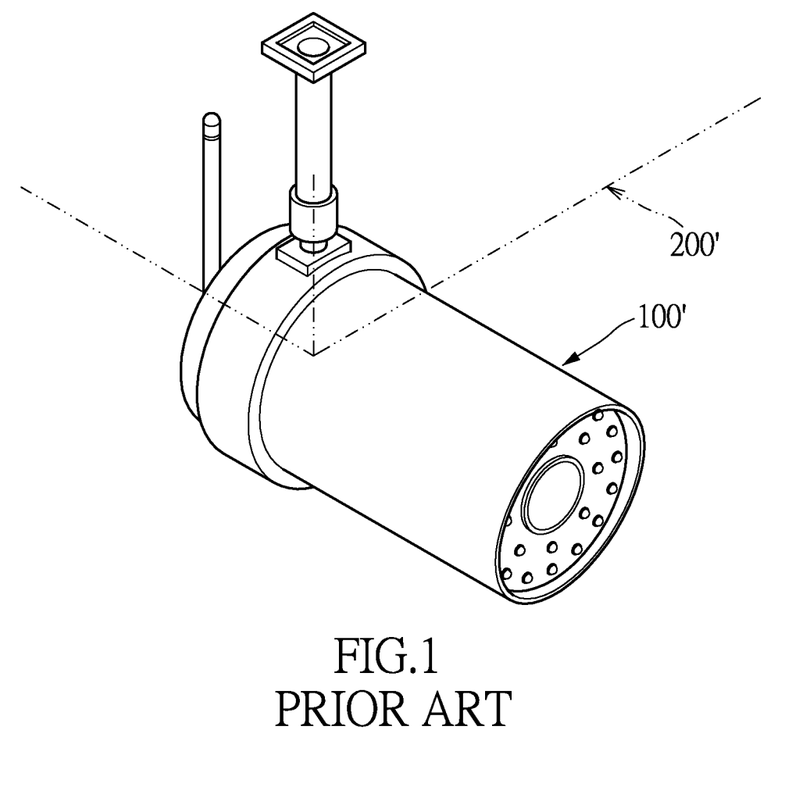
FIG. 1 is a perspective view of a conventional immovable wireless camera device.
Figure 2:
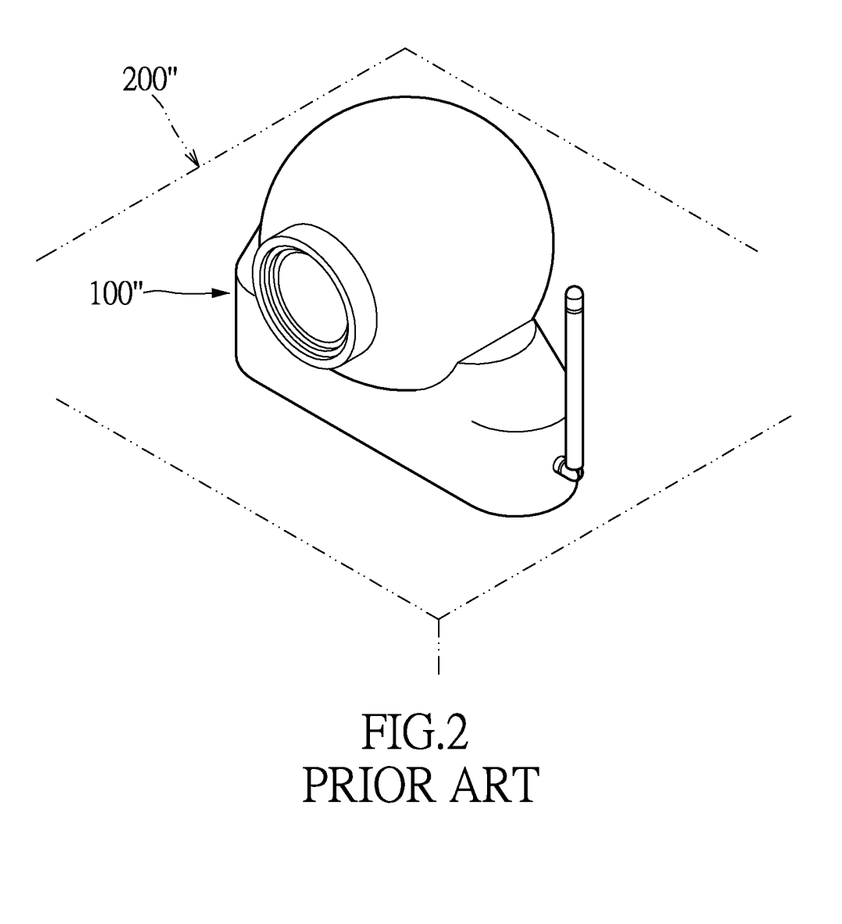
FIG. 2 is a perspective view of a conventional movable wireless camera device.

The conventional camera device includes two types, which are the wire camera device and the wireless camera device. The wireless camera device further includes two types, which are the immovable wireless camera device 100' (as shown in FIG. 1) and the movable wireless camera device 100" (as shown in FIG. 2). However, the immovable wireless camera device 100' and the movable wireless camera device 100" are still having some technical problems, and the problems are stated as follows.

Please refer to FIG. 1, the installation of the immovable wireless camera device 100' needs to drill the wall 200' to form with a plurality of holes by the professional machine for securing the immovable wireless camera device 100'. Moreover, the immovable wireless camera device 100' is almost fixed on a higher position, so that the power wires of the immovable wireless camera device 100' needs to be collated by the professional.

Please refer to FIG. 2. The movable wireless camera device 100" is usually disposed on a desk-top 200", such that the observing range of the movable wireless camera device 100" is limited by the height of the desk-top 200". If the movable wireless camera device 100" needs to be disposed on a higher position, a platform needs to be installed at the higher position for providing the movable wireless camera device 100" to be disposed thereon. Moreover, the movable wireless camera device 100" is operated by the battery arranged therein for having the movable property, but the movable wireless camera device 100" will stop to operate when the battery depletes electrical energy.

To achieve the abovementioned improvement, the inventors strive via industrial experience and academic research to present the instant disclosure, which can provide additional improvement as mentioned above.

SUMMARY OF THE INVENTION

One embodiment of the instant disclosure provides a wireless camera apparatus and a wireless camera device, which are simultaneously capable of the movable property and the staying power and further effectively reducing the installing difficulty.

The wireless camera apparatus of the instant disclosure comprises: a power supply track comprising: a frame having a pair of track bodies parallel to each other and arranged along a longitudinal direction; and a power supply module disposed on the frame; and a wireless camera device detachably installed on the power supply track, the wireless camera device comprising: a camera module comprising: a camera unit; a wireless transmission unit electrically connected to the camera unit for transmitting signal received by the camera unit; and an adapter unit electrically connected to the camera unit and the wireless transmission unit; and a linking module connected to the camera module, the linking module having a connecting unit and a conductive unit electrically connected to the adapter unit, wherein the linking module is adjustably arranged at a separable mold and an assembly mold with respect to the frame, wherein when the linking module is arranged at the assembly mold, the connecting unit is inserted into the track bodies, and the conductive unit is electrically connected to the power supply module; when the linking module is arranged at the separable mold, the connecting unit and the conductive unit are respectively separating from the track bodies and the power supply module for causing the wireless camera device detachable from the frame along a detaching direction non-parallel to the longitudinal direction.

Preferably, when the linking module is arranged at the assembly mold, the connecting unit is movably abutted against the track bodies for causing the wireless camera device slidable along the frame, and the conductive unit keeps electrical connection with the power supply module for maintaining the electrical connection between the adapter unit and the power supply module by the conductive unit.

The wireless camera device for installing on a power supply track, comprises: a camera module comprising: a camera unit; a wireless transmission unit electrically connected to the camera unit for transmitting signal received by the camera unit; an adapter unit electrically connected to the camera unit and the wireless transmission unit; and a casing configured to receive the camera unit, the wireless transmission unit, and the adapter unit therein, the camera unit at least partially exposed out of the casing; and a linking module comprising: a linking body connected to the casing and exposed out of the casing; a connecting unit fixed on the linking body and at least partially exposed out of the linking body; and a conductive unit fixed on the linking body and at least partially exposed out of the linking body, the conductive unit electrically connected to the adapter unit; wherein when the wireless camera device is installed on the power supply track, the connecting unit is coupled to the power supply track, and the conductive unit is electrically connected to the power supply track.

In summary, the wireless camera apparatus and the wireless camera device in the instant disclosure are simultaneously capable of the movable property and the staying power by the structural design to cooperate the linking module and the power supply track. Moreover, the installation of the power supply track and the assembly between the power supply track and the wireless camera device are easily for manipulating by a general user without professional.

In order to further appreciate the characteristics and technical contents of the instant disclosure, references are hereunder made to the detailed descriptions and appended drawings in connection with the instant disclosure. However, the appended drawings are merely shown for exemplary purposes, rather than being used to restrict the scope of the instant disclosure.

DETAILED DESCRIPTION OF THE PREFERRED EMBODIMENTS

Please refer to FIGS. 3 through 8, which show an embodiment of the instant disclosure. The instant embodiment provides a wireless camera apparatus 100 having a power supply track 1 and a wireless camera device 2. The power supply track 1 is used for fixing (e.g., screwing) on a working surface (e.g., wall) by a general user, and the wireless camera device 2 is detachably installed on the power supply track 1. The following description firstly discloses the construction of power supply track 1 and the construction of wireless camera device 2, and then discloses the relationship between the power supply track 1 and the wireless camera device 2.

Figure 6:
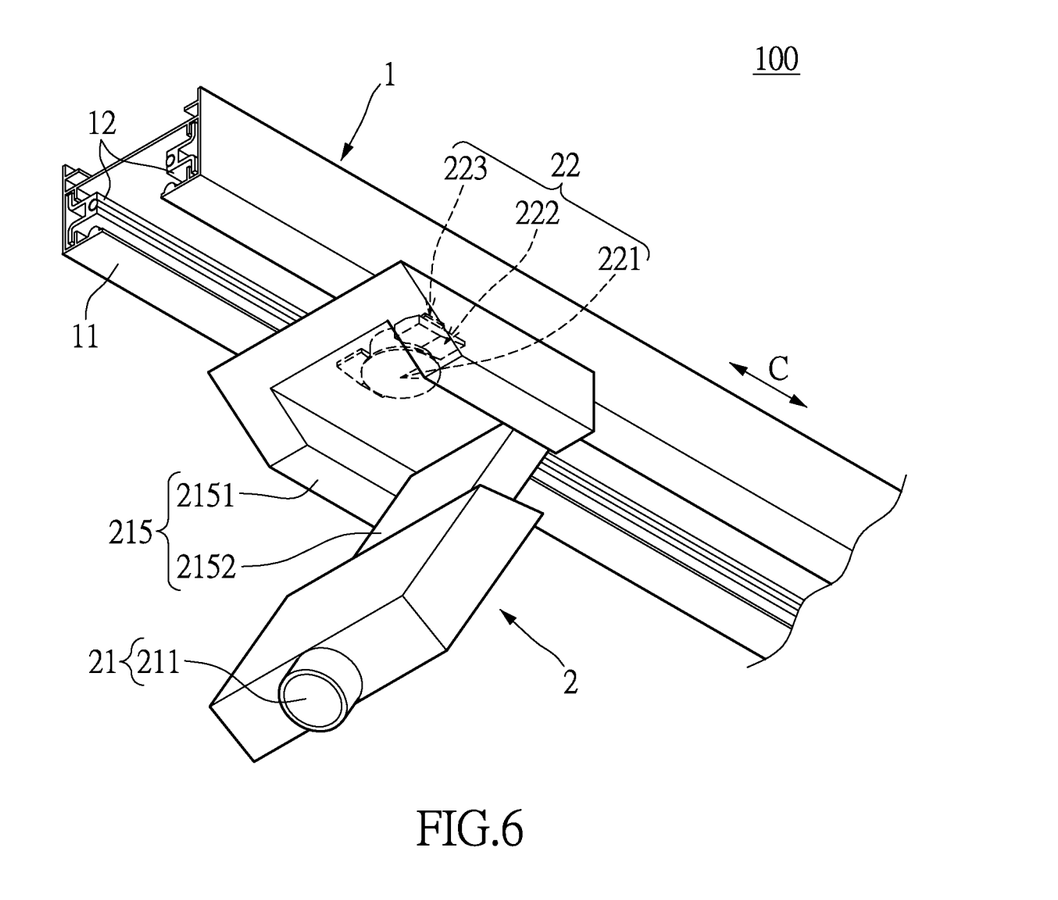
FIG. 6 is a perspective view of the wireless camera apparatus according to the instant disclosure when the wireless camera device arranged at an assembly mold.
Figure 7:
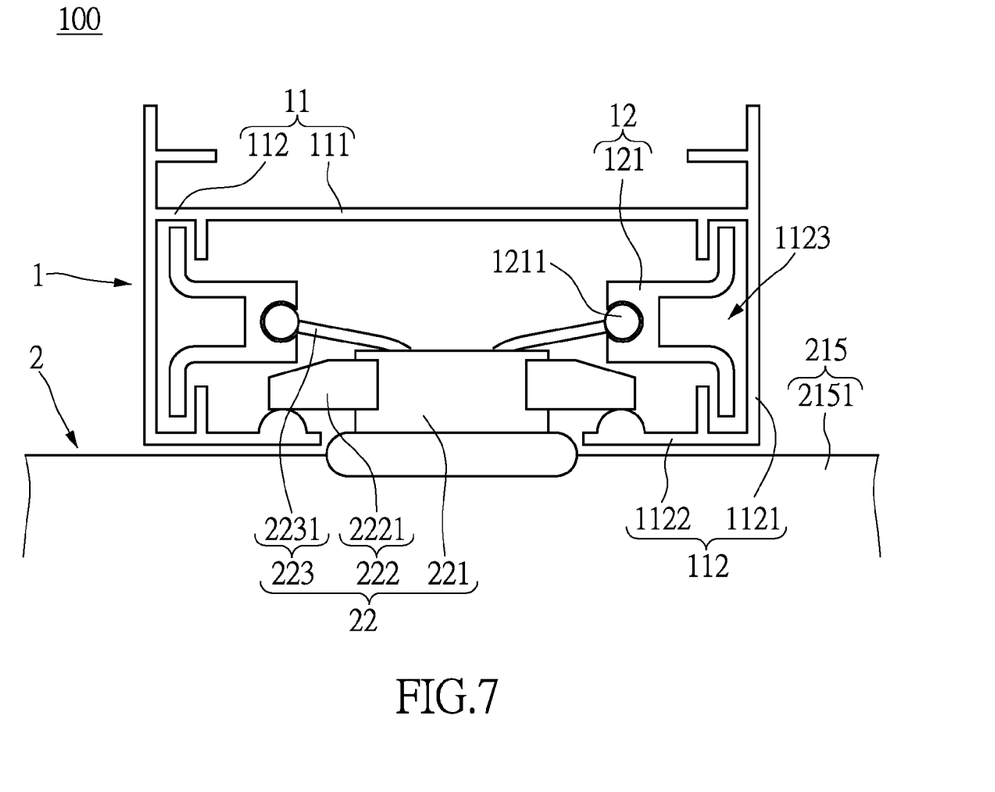
FIG. 7 is a partially cross-sectional view of FIG. 6.
Figure 8:
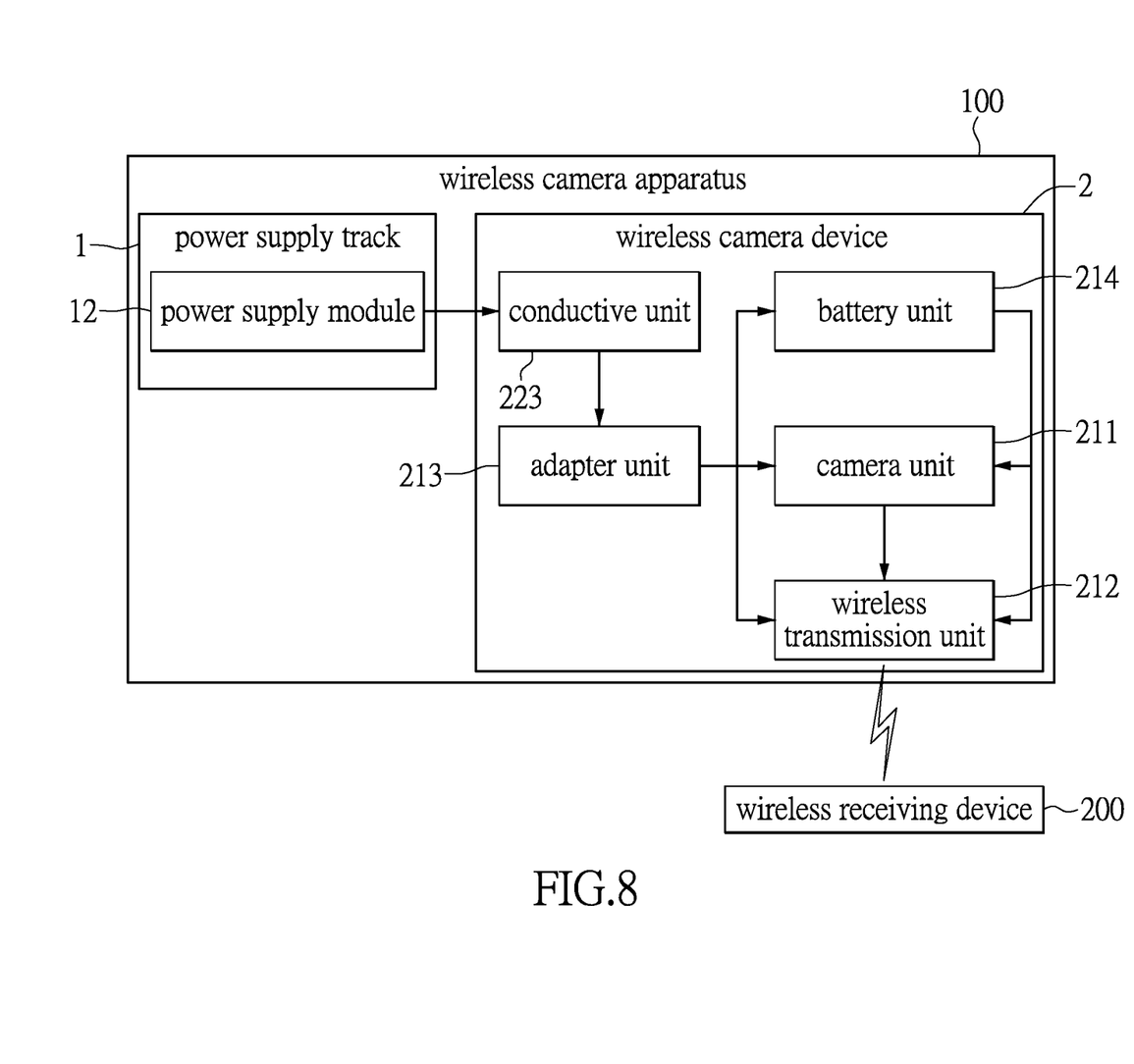
FIG. 8 is a functional block view of the wireless camera apparatus according to the instant disclosure.

Please refer to FIGS. 6 through 8. The power supply track 1 includes a frame 11 and a power supply module 12. The frame 11 has an elongated shape and defines a longitudinal direction C. The frame 11 in the instant embodiment is an integral structure and includes a base plate 111 and a pair of track bodies 112 parallel and facing to each other. The track bodies 112 are respectively and perpendicularly extended from two opposite edges of the base plate 111 (i.e., the left edge and the right edge of the base plate 111 as shown in FIG. 7) along the longitudinal direction C.

Moreover, each track body 112 includes a receiving portion 1121 and a carrying wall 1122. The cross-section of the receiving portion 1121, which is perpendicular to the longitudinal direction C, has a substantially C shape, and the notches of the C-shaped receiving portions 1121 are facing to each other. One end of the receiving portions 1121 (i.e., the top end of each receiving portion 1121 as shown in FIG. 7) are integrally extended from the opposite edges of the base plate 111, and the carrying walls 1122 are respectively and integrally extended from another end of the receiving portions 1121 (i.e., the bottom end of each receiving portion 1121 as shown in FIG. 7) toward with each other. Specifically, the inner surface of each receiving portion 1121 defines an accommodating slot 1123. Each carrying wall 1122 is arranged at a portion of the track body 112 away from the base plate 111, and the carrying walls 1122 are parallel to the base plate 111.

The power supply module 12 includes two power supply strips 121, and the length of each supply strip 121 is substantially identical to the length of each track body 112. The power supply strips 121 are respectively installed on the track bodies 112. A portion of each power supply strip 121 is inserted into the accommodating slot 1123 of the corresponding receiving portion 1121, and the other portion of each power supply strip 121 is exposed out of the corresponding receiving portion 1121. The exposed portions of the power supply strips 121 are respectively corresponding to the carrying walls 1122, and a gap is existed between each exposed portion of the power supply strip 121 and the corresponding carrying wall 1122.

Moreover, each power supply strip 121 has a metallic contacting portion 1211. The two contacting portions 1211 are elongated and respectively arranged on the exposed portions of the power supply strips 121, and the contacting portions 1211 face to each other. In particular, the contacting portions 1211 of the power supply strips 121 are configured to electrically connected to an outside power source (e.g., conventional outlet) for providing electrical energy to an device, which contacts with the contacting portions 1211. Each power supply strip 121 excluding the contacting portion 1211 is formed by insulating material.

The wireless camera device 2 includes a camera module 21, a linking module 22 connected to the camera module 21. The camera module 21 has a camera unit 211, a wireless transmission unit 212, an adapter unit 213, a battery unit 214, and a casing 215. The camera unit 211 can be formed with a Complementary Metal-Oxide-Semiconductor (CMOS), but is not limited thereto.

The electrical relationship of the components of camera module 21 is shown in FIG. 8 and approximately stated as follows. The wireless transmission unit 212 is electrically connected to the camera unit 211 for transmitting signal, which is received by the camera unit 211, to a wireless receiving device 200. The adapter unit 213 is electrically connected to the camera unit 211 and the wireless transmission unit 212. The battery unit 214 in the instant embodiment is a rechargeable battery, and the battery unit 214 is electrically connected to the adapter unit 213, the camera unit 211, and the wireless transmission unit 212.

The structural relationship of the components of camera module 21 is shown in FIGS. 6 and 7 and approximately stated as follows. The camera unit 211, the wireless transmission unit 212, the adapter unit 213, and the battery unit 214 are disposed in the casing 215, and the camera unit 211 at least partially exposes out of the casing 215.

Specifically, the casing 215 has a base seat 2151 and a main body 2152, and the main body 2152 is pivotally connected to the base seat 2151 for enabling to rotate with respect to the base seat 2151. The shape of base seat 2151 conforms with the shape of main body 2152, in particular, when the casing 215 is collapsed by the main body 2152 wedging with the base seat 2151, the contour of the casing 215 approximately presents as an entirely block (i.e., the main body 2152 and the base seat 2151 as shown in FIG. 6 can be wedged with each other to form a rectangular block).

Additionally, the pivotal connection between the main body 2152 and the base seat 2151 can be replaced by the other structures. For example, the main body and the base seat can be connected with each other by a universal joint (not shown); or, the base seat has a plurality connecting portions for respectively providing several different angles (not shown), the main body is selectively coupled to one of the connecting portions of the base seat, such that the angle between the main body and the base seat can be changed by the main body coupling to different connecting portions.

Moreover, the camera unit 211 is disposed in the main body 2152 and at least partially exposed out of the main body 2152, the wireless transmission unit 212 and the battery unit 214 are arranged inside the main body 2152, and the adapter unit 213 is arranged inside the base seat 2151. Incidentally, the components of the camera module 21 in the instant embodiment are arranged as the above description, but the arrangement of the components of the camera module 21 is not limited thereto. That is to say, the arrangement of the components of the camera module 21 can be adjusted according to the designer's request.

The linking module 22 includes a linking body 221, a connecting unit 222, and a conductive unit 223, and the connecting unit 222 and the conductive unit 223 are fixed on the linking body 221. The linking body 221 is fixed on the base seat 2151 of the casing 215 and exposed out of the casing 215. The linking module 22 and the main body 2152 are arranged on two opposite sides of the base seat 2151 (i.e., the upper side and the lower side of the base seat 2151 as shown in FIG. 6). Specifically, the linking body 221 is approximately cylindrical structure and insertable into a space surroundingly defined by the frame 11. When the linking body 221 is arranged in the space defined by the frame 11, the linking body 221 is rotatable at least 90 degrees with respect to the frame 11.

Additionally, the linking body 221 in the instant embodiment is integrally extended from the base seat 2151 for example, but is not limited thereto. For example, the linking body 221 can be screwed or wedged to the base seat 2151 (not shown).

The conductive unit 223 has two conductive pins 2231. The conductive pins 2231 are respectively fixed on two opposite sides of the linking body 221 (i.e., the left side and the right side of the linking body 221 as shown in FIG. 7) and electrically connected to the adapter unit 213 (as shown in FIG. 8). Each conductive pin 2231 is at least partially exposed out of the linking body 221, that is to say, each conductive pin 2231 has a resilient free end exposed out of the linking body 221. The connecting unit 222 has two sliding blocks 2221. The sliding blocks 2221 are respectively fixed on two opposite sides of the linking body 221 (i.e., the left side and the right side of the linking body 221 as shown in FIG. 7), and each sliding block 2221 is at least partially exposed out of the linking body 221, that is to say, each sliding block 2221 has a non-resilient free end exposed out of the linking body 221.

Specifically, the extension direction of the free ends of the conductive pins 2231 are approximately opposite, and the extension direction of the free ends of the sliding blocks 2221 are also approximately opposite. Moreover, a region of the sliding blocks 2221, which is defined by the conductive pins 2231 orthogonally projecting thereon, is located inside the contour of the sliding blocks 2221.

Additionally, the connecting unit 222 takes two sliding blocks 2221 installed on the linking body 221 for example, but is not limited thereto. For example, the sliding blocks 221 can integrally extend from the linking body 221 (not shown); or, the connecting unit 222 merely has an elongated sliding block coupled through the linking body for enabling two opposite ends of the elongated sliding block to expose out of the linking body (not shown).

The construction of the power supply track 1 and the wireless camera device 2 are disclosed in the above description, and the following description discloses the relationship between the power supply track 1 and the wireless camera device 2.

Figure 3:
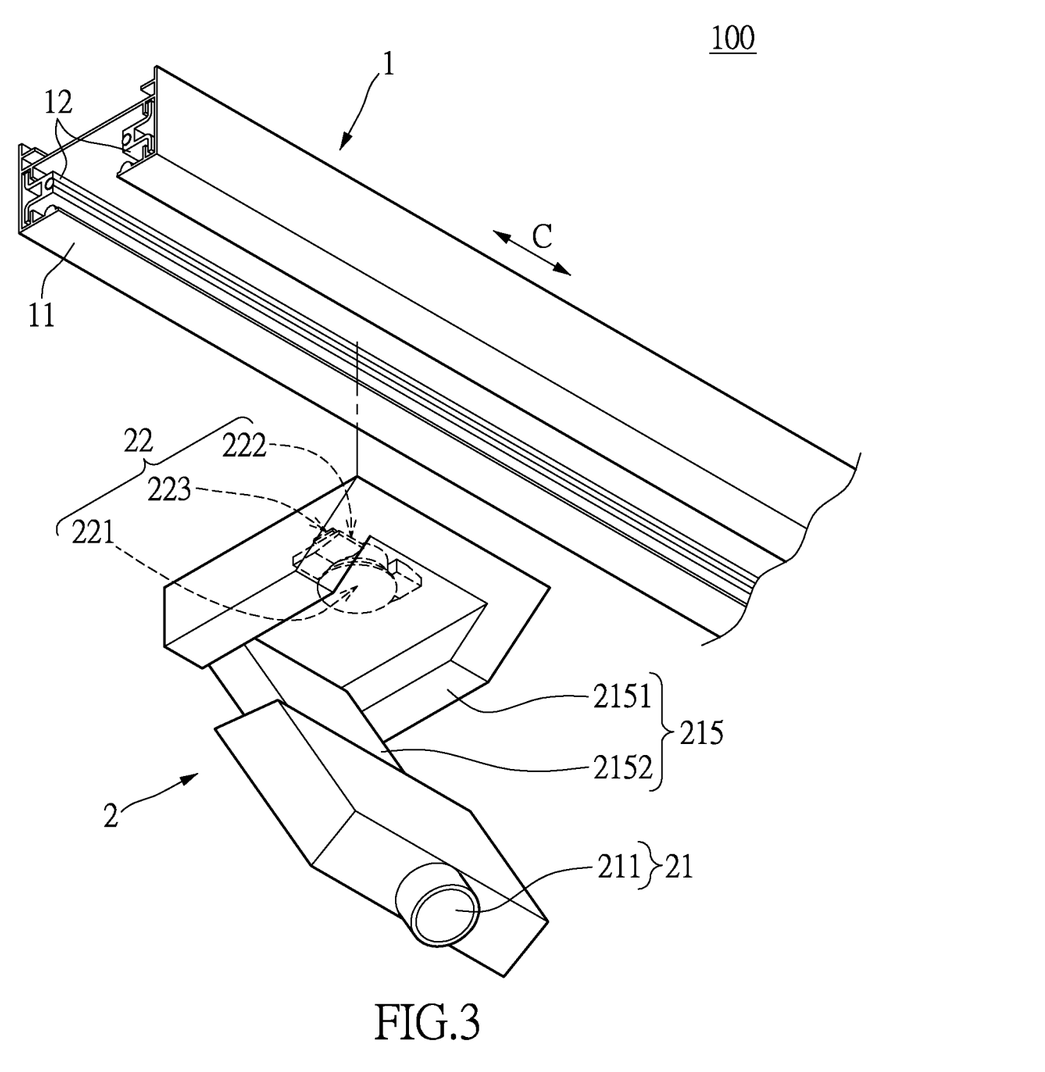
FIG. 3 is an exploded view of a wireless camera apparatus according to the instant disclosure.
Figure 4:
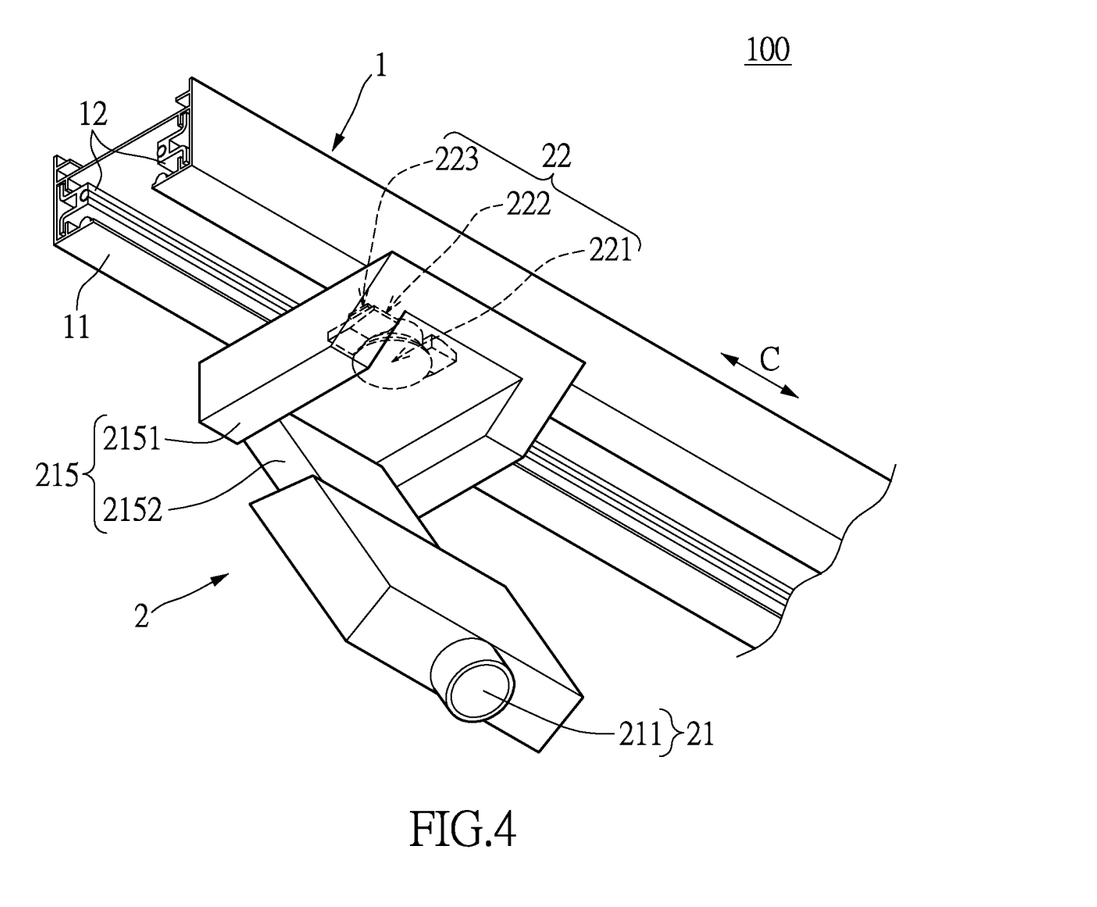
FIG. 4 a perspective view of the wireless camera apparatus according to the instant disclosure when a wireless camera device arranged at a separable mold.
Figure 5:
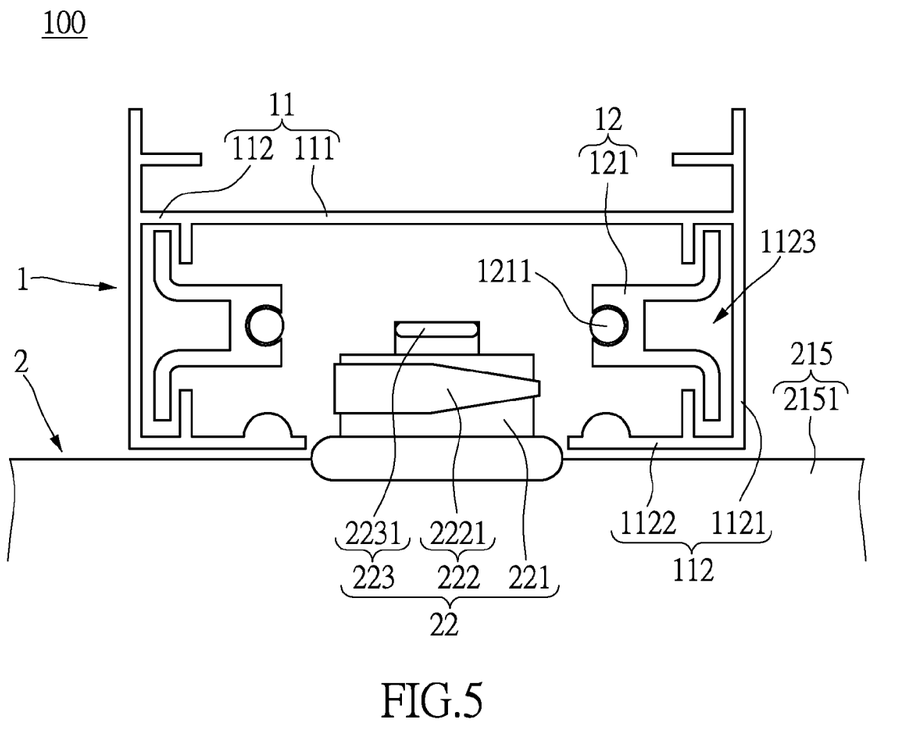
FIG. 5 is a partially cross-sectional view of FIG. 4.

Please refer to FIGS. 3 through 5. Firstly, installing the power supply track 1 on the working surface (e.g., wall). Specifically, the base plate 11 is fixed on the working surface by a fastener (e.g., screw or nail), and then taking the power supply module 12 to electrically connect the outside electrical power (e.g., conventional outlet) for causing the contacting portions 1211 of the power supply strips 121 to provide electrical energy.

The process of installing the wireless camera device 2 to the power supply track 1 is stated as follows. Taking the extension direction of the free ends of the conductive pins 2231 and the extension direction of the free ends of the sliding blocks 2221 are parallel to the longitudinal direction C of the frame 11, and then inserting the linking module 22 into the space defined by the frame 11. At this time, the position of the wireless camera device 2 in reference to the power supply track 1 is defined as a separable mold (as shown in FIGS. 4 and 5).

After that, please refer to FIGS. 4 through 7, rotating the wireless camera device 2 with respect to the power supply track 1 through 90 degrees to establish connection between the linking module 22 and the power supply track 1. At this time, the position of the wireless camera device 2 in reference to the power supply track 1 is defined as an assembly mold (as shown in FIGS. 6 and 7). In other words, the linking module 22 is rotatable with respect to the frame 11 to be arranged at the separable mold or the assembly mold.

When the linking module 22 is arranged at the assembly mold, the exposed portion of the sliding blocks 2221 are respectively carried by the carrying walls 122, and the sliding blocks 2221 are slidably abutted against the carrying walls 122, such that the wireless camera device 2 can slide along the frame 11 by the cooperation between the connecting unit 222 and the track bodies 112. The exposed portion of the conductive pins 2231 are respectively and movably abutted against the contacting portion 1121 of the power supply strips 121, thereby maintaining the electrical connection between the power supply module 12 and the camera module 21 by the conductive unit 223. In other words, when the wireless camera device 2 slides along the frame 11, the adapter unit 213 keeps to electrically connect to the power supply module 12 by the conductive unit 223. Besides, the conductive pin 2231 in the instant embodiment is formed as an elastic arm to resiliently contact the contacting portion 1121 of the power supply strip 121, so that the conductive pin 2231 can still abut against the contacting portion 1121 when the conductive pin 2231 moves with respect to the contacting portion 1121.

Finally, if the user needs to detach the wireless camera device 2 from the power supply track 1, rotating the wireless camera device 2 with respect to the power supply track 1 through 90 degrees to cause the linking module 22 to be arranged at the separable mold. At this time, the connecting unit 222 and the conductive unit 223 are respectively separating from the track bodies 112 and the power supply module 12 for causing the wireless camera device 2 detachable from the frame 11 along a detaching direction, which is non-parallel to the longitudinal direction C (i.e., the downward direction as shown in FIG. 5).

Base on the above, the wireless camera apparatus 100 in the instant embodiment can be installed easily without professional and wire collated problem. Moreover, the wireless camera device 2 is simultaneously capable of the movable property and the staying power.

In more detail, the wireless camera device 2 can be moved along the power supply track 1 to be arranged at a desired position, and the wireless camera device 2 can be detached from the power supply track 1 easily for changing the position thereof by installing on another power supply track 1. Moreover, when the power supply module 12 provides electrical energy to the wireless camera device 2 for normally operating wireless camera device 2, the power supply module 12 further provides electrical energy to charge the battery unit 214. When the power supply module 12 cannot provide electrical energy to the wireless camera device 2 for operating the wireless camera device 2 (e.g., power outage), the battery unit 214 can be used to provide electrical energy to the camera unit 211 and the wireless transmission unit 212 for operating the wireless camera device 2, thereby preventing the operation of the wireless camera device 2 form suddenly break off.

Additionally, the power supply track 2 in the instant embodiment provides electrical energy to the wireless camera device 2 by contact manner, but the power supply track 2 in a non-shown embodiment may provide electrical energy to the wireless camera device 2 by non-contact manner (e.g., magnetic force).

Moreover, the wireless camera apparatus 100 can further include an automatically driving module (not shown). For example, the connecting unit has a gear and a driving motor coupled to the gear, and a rack is installed on the carrying wall to engage the gear, so that the user can remote control the driving motor to cause the gear to move with respect to the rack for adjusting the wireless camera device to a predetermined position.

The above embodiment of the instant disclosure takes the linking module 22 to slide on the power supply track 1 for example. The following description states another embodiment of the instant disclosure, where the linking module 22 is designed to fix on the power supply track 1.

When the linking module 22 is arranged at the assembly mold, the exposed portion of the sliding blocks 2221 are respectively wedged with the track bodies 112 to fix the relative position between the wireless camera device 2 and the frame 11 by the cooperation between the connecting unit 222 and the track bodies 112. That is to say, the linking module 22 cannot move along the frame 11 when linking module 22 is arranged at the assembly mold. Moreover, the exposed portion of the conductive pins 2231 are respectively abutted against the contacting portions 1121.

When the linking module 22 is arranged at the separable mold, the linking module 22 is movable along the longitudinal direction C with respect to the frame 11 for adjusting the linking module 22 to be arranged at a predetermined position (e.g., the user's desired position). When the linking module 22 is adjusted at the predetermined position, the linking module 22 can be rotated to arrange at the assembly mold. During the linking module 22 moves with respect to the frame 11, the conductive pins 2231 are respectively separating from the contacting portions 1211, and the battery unit 214 continuingly provides electrical energy to the wireless camera device 2.

[The Possible Effects of the Instant Embodiment]

In summary, the wireless camera apparatus in the instant disclosure is simultaneously capable of the movable property and the staying power by the structural design to cooperate the linking module and the power supply track.

Moreover, the installation of the power supply track and the assembly between the power supply track and the wireless camera device are easily for manipulating by a general user without professional. The power wires are received in the frame for avoiding the wire collated problem.

Additionally, the battery unit of the wireless camera device is used to provide electrical energy to the camera unit and the wireless transmission unit for operating the wireless camera device, when the power supply module cannot provide electrical energy to the wireless camera device (e.g., power outage), thereby preventing the operation of the wireless camera device form suddenly break off.

The descriptions illustrated supra set forth simply the preferred embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. A wireless camera apparatus, comprising:
  a power supply track comprising:
    a frame having a pair of track bodies parallel to each other and arranged along a longitudinal direction; and
    a power supply module disposed on the frame; and
  a wireless camera device detachably installed on the power supply track, the wireless camera device comprising:
    a camera module comprising:
      a camera unit;
      a wireless transmission unit electrically connected to the camera unit for transmitting signal received by the camera unit;
      an adapter unit electrically connected to the camera unit and the wireless transmission unit; and
      a casing, wherein the camera unit, the wireless transmission unit, and the adapter unit are installed in the casing, and the camera unit at least partially exposes out of the casing; and
    a linking module connected to the camera module, the linking module having a connecting unit, a conductive unit electrically connected to the adapter unit, and a linking body connected to the casing and exposed out of the casing, wherein the linking module is adjustably arranged at a separable mold and an assembly mold with respect to the frame, and wherein the connecting unit and the conductive unit are installed on the linking body, the linking body is insertable into a space surroundingly defined by the frame,
    wherein when the linking module is arranged at the assembly mold, the connecting unit is inserted into the track bodies, and the conductive unit is electrically connected to the power supply module; when the linking module is arranged at the separable mold, the connecting unit and the conductive unit are respectively separating from the track bodies and the power supply module for causing the wireless camera device detachable from the frame along a detaching direction non-parallel to the longitudinal direction.

2. The wireless camera apparatus according to claim 1, wherein the power supply module includes two power supply strips respectively fixed on the track bodies, the conductive unit includes two conductive pins fixed on the linking body and electrically connected to the adapter unit, and each conductive pin at least partially exposes out of the linking body; and wherein when the linking module is arranged at the assembly mold, the exposed portion of the conductive pins are respectively abutted against the power supply strips.

3. The wireless camera apparatus according to claim 1, wherein the connecting unit includes two sliding blocks fixed on the linking body, and each sliding block at least partially exposes out of the linking body; and wherein when the linking module is arranged at the assembly mold, the exposed portion of the sliding blocks are respectively carried by the track bodies.

4. The wireless camera apparatus according to claim 1, wherein the casing includes a base seat and a main body pivotally connected to the base seat, the linking body is disposed on the base seat, the camera unit is disposed in the main body and at least partially exposed out of the main body, the linking module and the main body are arranged on two opposite sides of the base seat.

5. The wireless camera apparatus according to claim 1, wherein the camera module further has a battery unit electrically connected to the adapter unit, the camera unit, and the wireless transmission unit; and wherein the battery unit is configured to provide electrical energy to the camera unit and the wireless transmission unit, when the power supply module stop to supply electrical energy to the wireless camera device.

6. The wireless camera apparatus according to claim 1, wherein when the linking module is arranged at the assembly mold, the connecting unit is movably abutted against the track bodies for causing the wireless camera device slidable along the frame, and the conductive unit keeps electrical connection with the power supply module for maintaining the electrical connection between the adapter unit and the power supply module by the conductive unit.

7. A wireless camera device for installing on a power supply track, comprising:

a camera module comprising:
  a camera unit;
  a wireless transmission unit electrically connected to the camera unit for transmitting signal received by the camera unit;
  an adapter unit electrically connected to the camera unit and the wireless transmission unit; and
  a casing configured to receive the camera unit, the wireless transmission unit, and the adapter unit therein, the camera unit at least partially exposed out of the casing; and
a linking module comprising:
  a linking body connected to the casing and exposed out of the casing;
  a connecting unit fixed on the linking body and at least partially exposed out of the linking body; and
  a conductive unit fixed on the linking body and at least partially exposed out of the linking body, the conductive unit electrically connected to the adapter unit;
wherein when the wireless camera device is installed on the power supply track, the connecting unit is movably abutted against the power supply track for causing the wireless camera device slidable along the power supply track, and the conductive unit keeps electrical connection with the power supply track for maintaining the electrical connection between the adapter unit and the power supply track via the conductive unit.

8. The wireless camera device according to claim 7, wherein the camera module further has a battery unit arranged in the casing and electrically connected to the adapter unit, the camera unit, and the wireless transmission unit.

9. A wireless camera apparatus, comprising:
a power supply track comprising:
  a frame having a pair of track bodies parallel to each other and arranged along a longitudinal direction; and
  a power supply module disposed on the frame; and
a wireless camera device detachably installed on the power supply track, the wireless camera device comprising:
  a camera module comprising:
    a camera unit;
    a wireless transmission unit electrically connected to the camera unit for transmitting signal received by the camera unit; and
    an adapter unit electrically connected to the camera unit and the wireless transmission unit; and
  a linking module connected to the camera module, the linking module having a connecting unit and a conductive unit electrically connected to the adapter unit, wherein the linking module is adjustably arranged at a separable mold and an assembly mold with respect to the frame,
wherein when the linking module is arranged at the assembly mold, the connecting unit is inserted into the track bodies and is movably abutted against the track bodies for causing the wireless camera device slidable along the frame, and the conductive unit keeps electrical connection with the power supply module for maintaining the electrical connection between the adapter unit and the power supply module by the conductive unit; when the linking module is arranged at the separable mold, the connecting unit and the conductive unit are respectively separating from the track bodies and the power supply module for causing the wireless camera device detachable from the frame along a detaching direction non-parallel to the longitudinal direction.

* * * * *